United States Patent
Suzuki

(10) Patent No.: US 8,124,887 B2
(45) Date of Patent: Feb. 28, 2012

(54) PROTECTOR

(75) Inventor: Takashi Suzuki, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 438 days.

(21) Appl. No.: 12/439,248

(22) PCT Filed: Mar. 7, 2007

(86) PCT No.: PCT/JP2007/054388
§ 371 (c)(1),
(2), (4) Date: Feb. 27, 2009

(87) PCT Pub. No.: WO2008/050496
PCT Pub. Date: May 2, 2008

(65) Prior Publication Data
US 2009/0301758 A1   Dec. 10, 2009

(30) Foreign Application Priority Data

Sep. 28, 2006  (JP) .................................. 2006-266031

(51) Int. Cl.
*H02G 3/08* (2006.01)
(52) U.S. Cl. ...... 174/481; 174/68.1; 174/68.3; 174/72 A
(58) Field of Classification Search .................. 174/480, 174/481, 135, 68.1, 68.3, 72 A, 72 R, 88 R; *H02G 3/14*
See application file for complete search history.

(56) References Cited

U.S. PATENT DOCUMENTS 6,861,589 B2 * 3/2005 Katsumata et al. ........... 174/68.3
6,878,879 B2 * 4/2005 Takahashi et al. ........... 174/72 A (Continued)

FOREIGN PATENT DOCUMENTS

| JP | 6-5320 | 1/1994 |
|---|---|---|
| JP | 2000-287336 | 10/2000 |
| JP | 2005-168132 | 6/2005 |
| JP | 2006-74844 | 3/2006 |

OTHER PUBLICATIONS

JP 2000287336 Translation, Jun. 21, 2011, JPO, http://dossier.ipdl.inpit.go.jp/text_trans.html.*

(Continued)

*Primary Examiner* — Quyen Leung
*Assistant Examiner* — Thomas Truong
(74) *Attorney, Agent, or Firm* — Greenblum & Bernstein P.L.C.

(57) ABSTRACT

Locking hooks 26a are engaged with and locked into locking hook engaging frames 26b, the locking hooks 26a being provided in a lower end portion on both sides in a width direction of a lid 12, the locking hook engaging frames 26b being provided in an upper end portion on both sides in the width direction of a protector main body 11. The lid 12 has a portion having one of cross-sectionally arcuate, inverted V, and trapezoidal shapes. The lid 12 having one of the shapes is provided with one of the locking hooks 26a on a first side of the lower end portion in the width direction, and a projection 28 having a narrow width on an opposing second side of the lower end portion. The protector main body 11 covered by the lid 12 having one of the shapes is provided with one of the projecting locking hook engaging frames 26b locked with the locking hook 26a on the first side in the width direction, and an L-shaped stopper 29 having a narrow width and contacted by a lower end of the projection 28 on the opposing second side.

1 Claim, 6 Drawing Sheets

U.S. PATENT DOCUMENTS

| | | | |
|---|---|---|---|
| 7,017,615 B2 * | 3/2006 | Suzuki et al. | 138/110 |
| 7,038,133 B2 * | 5/2006 | Arai et al. | 174/72 A |
| 7,119,275 B2 * | 10/2006 | Suzuki et al. | 174/503 |
| 2005/0106934 A1 | 5/2005 | Hatori | |
| 2005/0133247 A1 | 6/2005 | Hatori | |
| 2005/0136749 A1 | 6/2005 | Daito | |
| 2006/0090916 A1 | 5/2006 | Suzuki et al. | |

OTHER PUBLICATIONS

English language Abstract of JP 2000-287336, Oct. 13, 2000.
English language Abstract of JP 2006-74844, Mar. 16, 2006.
English language Abstract of JP 2005-168132, Jun. 23, 2005.
U.S. Appl. No. 12/439,310 to Suzuki, filed Feb. 27, 2009.

* cited by examiner (A)

(B)

(A)

(B)

(C)

(D)

(A)

(B)

PROTECTOR

BACKGROUND OF THE INVENTION

1. Field of the Invention

The present invention relates to a protector mounted on an electric wire bundle (wire harness) routed in a vehicle, particularly to a protector having an improved lock structure of a protector main body and a lid.

2. Description of Related Art

A resin protector is mounted on a wire harness routed in a vehicle for electric wire protection and routing control. A protector of this type generally has a cross-sectionally rectangular frame shape, as shown in FIG. 6 (Refer to Japan Utility Model Application Laid-open Publication No. H6-5320). More specifically, the protector includes a main body 2 having a square tub shape and a lid 3 having a cross-sectionally square C shape, the main body 2 housing a wire harness W inserted therethrough. Latching hooks 4a are engaged with latching frames 4b, the latching hooks 4a being provided at mutually opposing positions on both side walls in a width direction of a lower end portion of the lid 3, the latching frames 4b projecting from both side walls of the main body 2. Thereby, the lid 3 is placed over an upper surface opening of the main body 2, and the lid 3 is locked into the main body 2. The locking portions are generally provided in both end portions in a length direction of the protector.

Due to routing design that requires a wire harness W to bend, conditions for setting a fixing portion on a vehicle, and the like, however, a protector 5 may have a short length "a" from a protector end 5a to a vehicle fixing portion 9, as shown in FIG. 7A. In this case, a lock structure may be provided on a first end side of an end portion of the protector 5, but not on an opposing second end side.

In addition, when corrugated tubes are provided on both sides of the wire harness, which sandwich a portion inserted into the protector 5, a protector main body 6 and a lid 7 are formed into a cross-sectionally semi-annular shape. In this case, even when the lid 7 is pressed against the main body 6 in order to lock a latching hook 8a projecting from the lid 7 into a latching frame 8b provided on the main body 6, as shown in FIG. 7B, the lid 7 slides in along an arcuate external circumferential surface of the main body 6 and causes a gap on the second end side, to which a lock structure is not provided. It is thus difficult to accurately engage and lock the latching hook 8a to the engaging frame 8b on the first end side. The problem above also arises when only the lid 7 has a cross-sectionally arcuate shape or when the lid 7 has inclined both side walls in a width direction.

Related Art 1: Japan Utility Model Application Laid-open Publication No. H6-5320

SUMMARY OF THE INVENTION

The present invention is provided to address the above-described problems. The present invention is intended to provide a protector enabling accurate and easy locking on a first side, when the protector is provided with a locking portion on the first side of two sides in a width direction of the protector, but is not provided with a locking portion on a second side.

In order to solve the above-described problems, the present invention provides a protector including a protector main body having an upper surface opening through which an electric wire bundle is inserted, and a lid covering the upper surface opening of the protector main body. The protector main body and the lid are resin molded parts. Locking hooks are engaged with and locked into locking hook engaging frames, the locking hooks being provided in a lower end portion on both sides in a width direction of the lid, the locking hook engaging frames being provided in an upper end portion on both sides in the width direction of the protector main body. The lid has a portion having one of cross-sectionally arcuate, inverted V, and trapezoidal shapes. The lid having one of the shapes is provided with one of the locking hooks on a first side of the lower end portion in the width direction, and a projection having a narrow width on an opposing second side of the lower end portion. The protector main body covered by the lid having one of the shapes is provided with one of the projecting locking hook engaging frames locked with the locking hook on the first side in the width direction, and an L-shaped stopper having a narrow width and contacted by a lower end of the projection on the opposing second side.

When the cover is placed over and pressed against the main body, the projection of the lid is stopped by the stopper of the main body, and thus the protector according to the present invention prevents the lid from sliding or causing a gap and thus fixes a support point. Thereby, the protector allows accurate and easy locking of the locking hook and the locking hook frame on the first side.

In addition, the projection and the stopper can be formed into a narrow-width shape. Thus, the projection and the stopper can be provided in a space where the locking hook and the locking hook engaging frame cannot be provided. Thereby, the protector requires less space and increases flexibility in routing design of electric wire bundles.

Particularly, the protector is suitable when the lid and the protector main body respectively have cross-sectionally arcuate end portions on both sides in a length direction, and are combined to form a cross-sectionally annular shape into which corrugated tubes mounted on the wire harness are fitted. In this case, the lid is provided with one of the locking hooks on the first side in the cross-sectionally arcuate end portion, and the projection on the second side in the end portion. The facing protector main body is provided with one of the locking hook engaging frames on the first side in the cross-sectionally arcuate end portion, and a projecting vehicle fixing portion and the stopper on the second side in the end portion, the vehicle fixing portion being provided proximate to an end of the second side, the stopper being provided between the vehicle fixing portion and the end.

Thereby, even when a distance from the end of the protector to the vehicle fixing portion needs to be designed short, the locking hook and the locking hook engaging frame, which are provided only on the first side in the width direction of the end portion of the protector, can be engaged accurately and easily. The protector thus eliminates a restriction that requires locking portions to be provided on both sides opposing each other in the width direction of the protector, thereby increasing design flexibility in routing of electric wire bundles and layout of vehicle components.

In addition, the both end portions of the lid and the protector main body have a cross-sectionally arcuate shape, which allows the corrugated tubes mounted on the electric wire bundle to fit inside thereof and thus to be positioned and fixed to the protector. Thereby, fixing by taping and other work are eliminated.

As described above, the protector of the present invention is provided with the narrow projection and the stopper stopping the projection on the second side where no locking portion can be provided. Thus, even when locking portions cannot be provided on both sides opposing each other in the width direction due to routing of electric wire bundles and others, the protector prevents the lid from sliding when the lid is fitted, and thus allows accurate and easy locking of the locking portion provided on the first side.

In addition, even when the lid and the main body are not provided with mutually opposing locking portions, the projection and the stopper provided on the second side opposite to the first side having the locking portion enable easy locking, and thus increase flexibility in design change in accordance with routing of electric wire bundles and layout of vehicle components.

Figure 1:
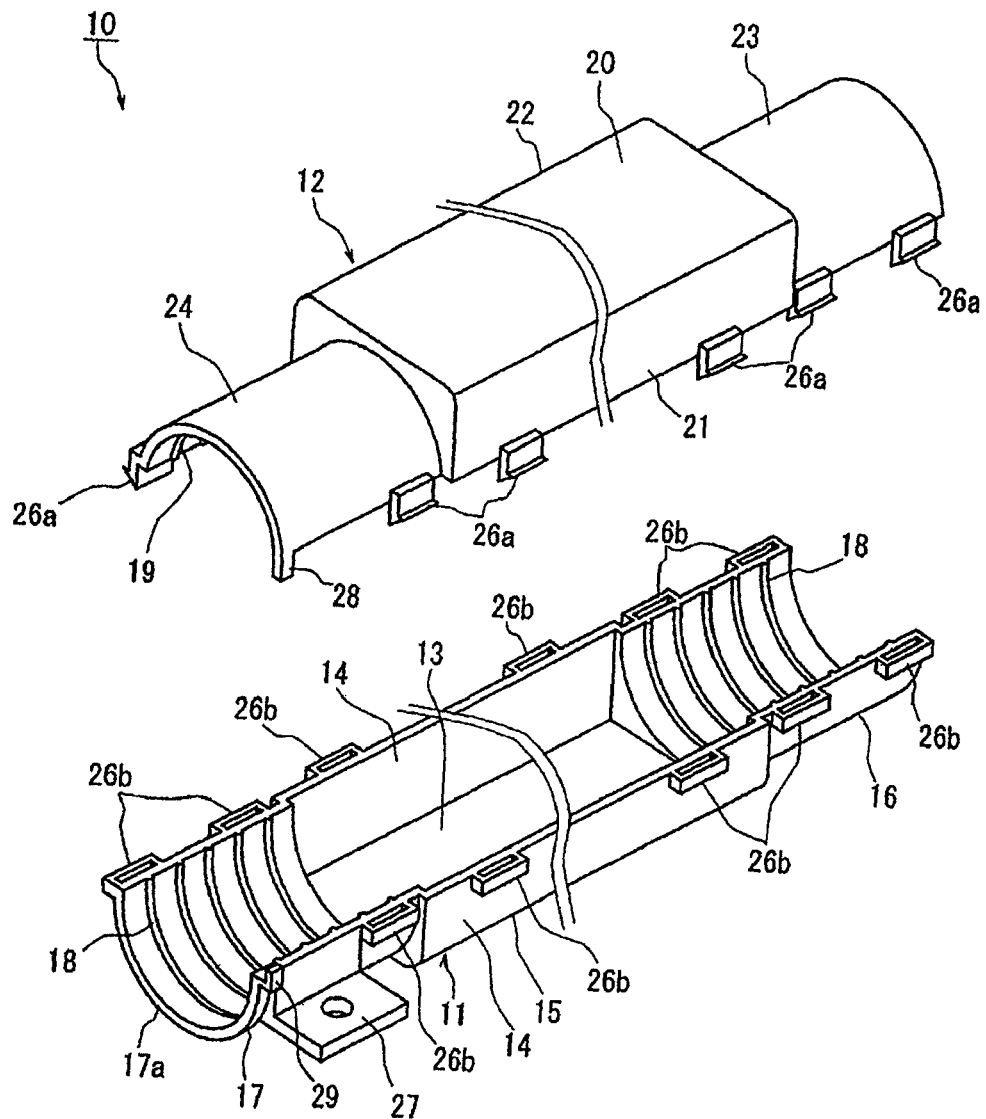
FIG. 1 is an exploded perspective view of a protector according to a first embodiment of the present invention.
Figure 2:
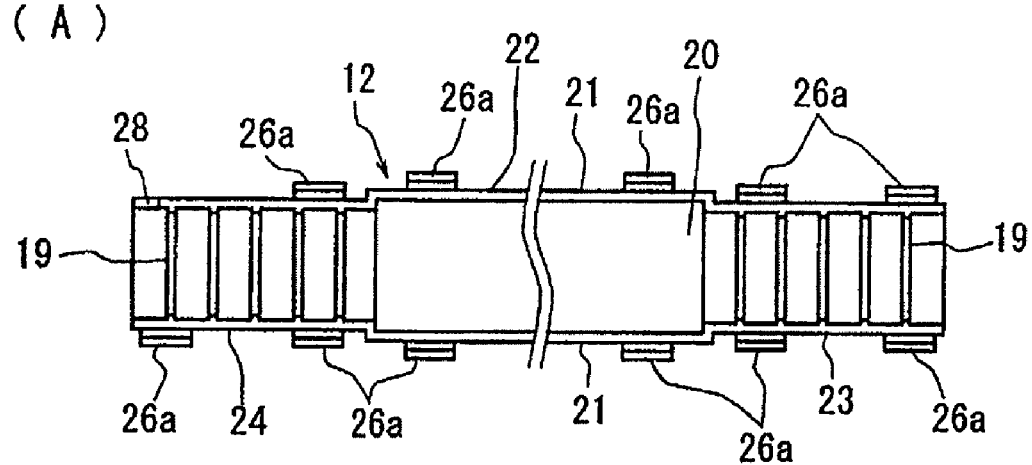
FIG. 2A is a rear view of a protector lid.
FIG. 2B is a plan view of a protector main body.
Figure 2:
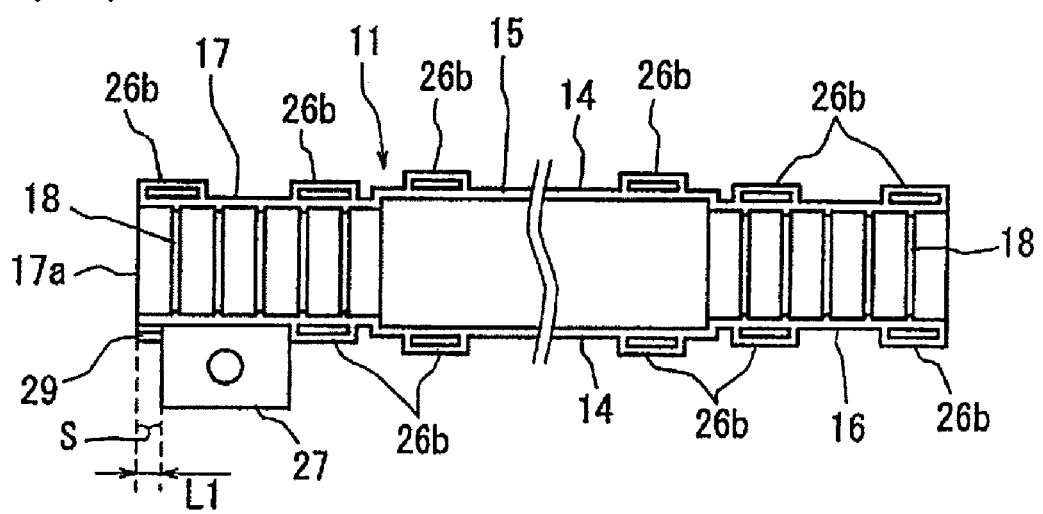
Figure 3:
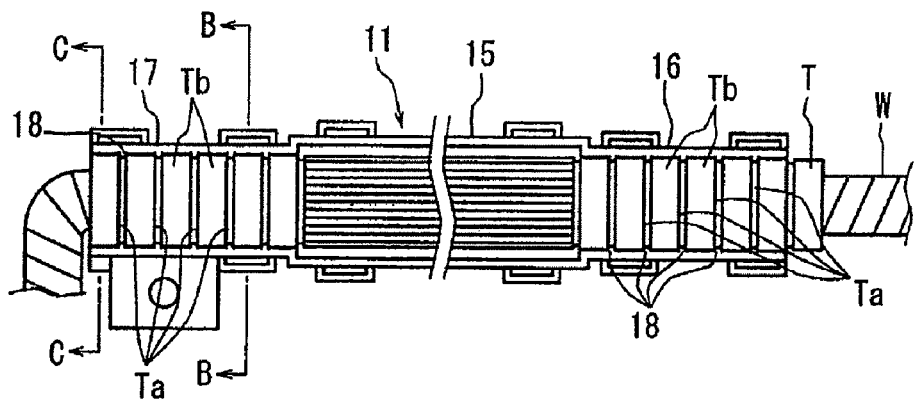
FIG. 3A is a plan view of a wire harness inserted through the protector main body in a process of mounting the protector on the wire harness.
FIG. 3B is a cross-sectional view along line B-B in FIG. 3A, when the lid is fitted into the protector main body in the process of mounting the protector on the wire harness.
FIG. 3C is a cross-sectional view along line C-C in FIG. 3A, when the lid is fitted into the protector main body in the process of mounting the protector on the wire harness.
FIG. 3D illustrates a modification example in the process of mounting the protector on the wire harness.
Figure 3:
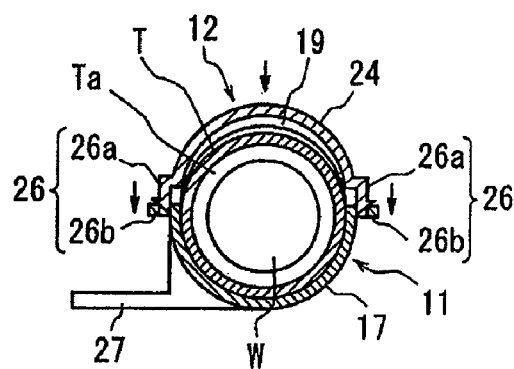
Figure 3:
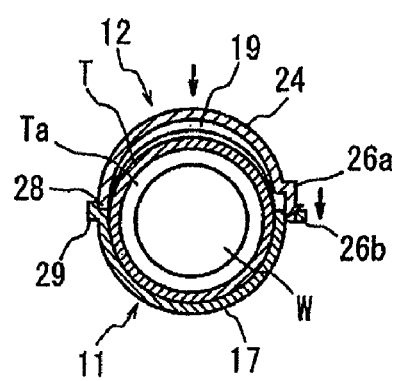
Figure 3:
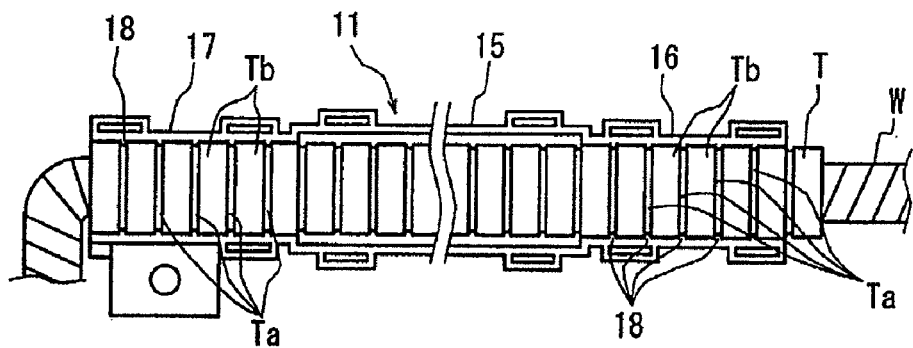

10 Protector
11 Protector main body
12 Lid
16, 17 Tube fixing portion
23, 24 Tube fixing portion lid
26 Locking portion
26a Locking hook
26b Locking hook engaging frame
28 Projection
29 Stopper
W Wire harness

DETAILED DESCRIPTION OF PREFERRED EMBODIMENTS

The embodiments of the present invention are explained below with reference to the drawings. In any embodiments explained below, the present invention is applied to a protector for a wire harness routed in a vehicle.

A protector 10 according to a first embodiment of the present invention is shown in FIGS. 1 through 3D. The protector 10 includes a protector main body 11 and a lid 12 as separate bodies, the protector main body 11 having an upper surface opening through which a wire harness W is inserted, the lid 12 covering the upper surface opening of the protector main body 11 and locking thereinto. The protector main body 11 and the lid 12 are resin molded parts.

A corrugated tube T is provided on portions of the wire harness W not inserted through the protector 10, as shown in FIG. 3A. The corrugated tube T is not provided on a portion inserted through the protector 10, and thus only an electric wire bundle of the wire harness is inserted therethrough. When the protector 10 is short in length, the corrugated tube T is also provided continuously on the portion of the wire harness W inserted through the protector, as shown in FIG. 3D. The corrugated tube T is formed from synthetic resin and is provided with alternating annular recesses Ta and projections Tb in an axis line direction, so as to be flexible.

The protector main body 11 includes an electric wire insertion portion 15 and tube fixing portions 16 and 17, as shown in FIG. 1. The electric wire insertion portion 15 has a square tub shape provided with a bottom wall 13 and both side walls 14. The tube fixing portions 16 and 17 have a cross-sectionally arcuate shape and extend from front and rear sides in a length direction of the electric wire insertion portion 15. A plurality of ribs 18 are projected on internal circumferential surfaces of the tube fixing portions 16 and 17, and are fitted with the recesses Ta of the corrugated tube T.

The lid 12 includes an electric wire insertion portion lid 22 and tube fixing portion lids 23 and 24, as shown in FIGS. 1 and 2A. The electric wire insertion portion lid 22 has a cross-sectionally square C shape provided with an upper wall 20 and both side walls 21, so as to fit to the shape of the protector main body 11. The tube fixing portion lids 23 and 24 have a cross-sectionally arcuate shape and extend from front and rear sides of the electric wire insertion portion lid 22. A plurality of ribs 19 are projected on internal circumferential surfaces of the tube fixing portion lids 23 and 24, and are fitted with the recesses Ta of the corrugated tube T.

Locking hooks 26a are projected in a lower end portion of the both side walls 21 of the lid 12, the locking hooks 26a being provided opposing each other in the width direction having a predetermined distance in between in the length direction. Locking hook engaging frames 26b are projected on an upper end external surface of the both side walls 14 of the protector main body 11, the locking hook engaging frames 26b being positioned corresponding to the locking hooks 26a.

The tube fixing portion 16, which is one end side portion of the tube fixing portions 16 and 17 of the protector main body 11, is provided with the locking hook engaging frames 26b in a pair on right and left sides at front and rear end portions. The tube fixing portion 17 of the other end side portion is provided with a pair of the locking hook engaging frames 26b on left and right sides at a rear end portion, as shown in FIGS. 1 and 2B. At a front end portion, however, the locking hook engaging frame 26b is projected only on a first side. On a second side, a vehicle fixing portion 27 is projected proximate to an end. In a space S having a length L1 from the vehicle fixing portion 27 to the end 17a, a cross-sectionally L-shaped stopper 29 is provided, with which a lower end of a projection 28 (described hereinafter) is contacted.

The tube fixing portion lid 23, which is one end side portion of the tube fixing portion lids 23 and 24 of the lid 12, is provided with the locking hooks 26a projecting in a pair on right and left side edges at front and rear end portions, as shown in FIG. 2A. The tube fixing portion lid 24 of the other side portion is provided with a pair of the locking hooks 26a on left and right side edges at a rear end portion, as shown in FIG. 1. However, the locking hook 26a is projected only on a first side edge. On an opposing second side edge, the projection 28 is provided downwardly, the projection 28 having a width (size in the length direction of the protector) shorter than the length L1.

Procedures for mounting the protector 10 on the wire harness W are explained below. As shown in FIG. 3A, the wire harness W mounted with the corrugated tubes T is first inserted through the protector main body 11. The ribs 18 of the tube fixing portions 16 and 17 are fitted into and positioned to the recesses Ta of the corrugated tubes T. Then, the lid 12 is placed on the upper surface of the protector main body 11. The locking hooks 26a of the lid 12 and the locking hook engaging frames 26b of the protector main body 11 are positioned. The lid 12 is then pressed against the protector main body 11 and locked thereinto.

When the cross-sectionally arcuate tube fixing portions 16 and 17 and tube fixing portion lids 23 and 24 are locked, a middle portion of the tube fixing portion lids 23 and 24 is pressed, as shown in FIG. 3B, so that a pair of locking portions 26 provided opposing each other in the width direction are locked simultaneously. Meanwhile, when the end side portions of the tube fixing portion 17 and the tube fixing portion lid 24 are locked, the lower end of the projection 28 of the lid 24 is contacted with the stopper 29 of the tube fixing portion 17 on the second side, as shown in FIG. 3C. While sliding is prevented as above, a middle portion of the tube fixing portion lid 24 is pressed, so that the locking hook 26a is inserted and locked into the locking hook engaging frame 26b on the first side.

The protector 10 of the present embodiment is provided with the locking hook engaging frame 26b only on the first side of the opposing positions in the end portion of the tube fixing portion 17. Although a space is unavailable to provide the locking hook engaging frame 26b on the second side, the narrow stopper 29 can be provided even in the narrow space S. When the stopper 29 receives the narrow projection 28 projecting from the tube fixing portion lid 24, the cross-sectionally arcuate tube fixing portion lid 24 can be prevented from sliding or causing a gap. Thereby, the locking hook 26a of the tube fixing portion lid 24 can be surely locked into the locking hook engaging frame 26b on the first side, thus improving workability.

Further, locking the tube fixing portions 16 and 17 and the tube fixing portion lids 23 and 24 forms a cross-sectionally annular shape and thus fits onto the corrugated tubes T. In addition, the ribs 18 and 19 provided on the internal circumferential surfaces of the annular portions are fitted to the recesses Ta of the corrugated tubes T. Thereby, the corrugated tubes T can be positioned and fixed to the protector 10, thus eliminating fixing by taping and other work.

Figure 4:
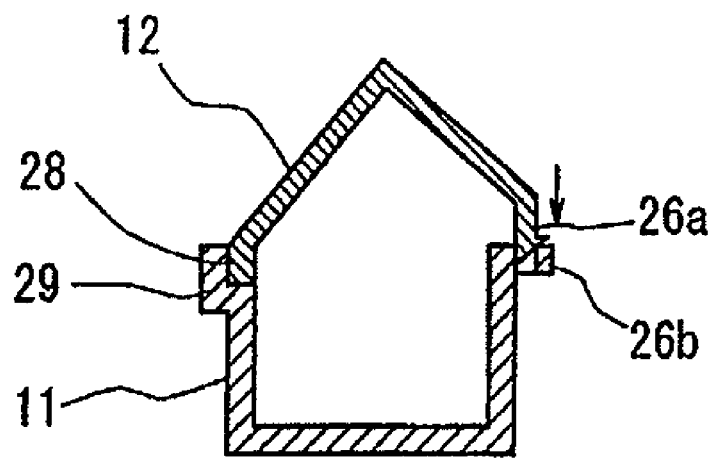
FIG. 4 is a cross-sectional view illustrating an alternative lid shape.
Figure 5:
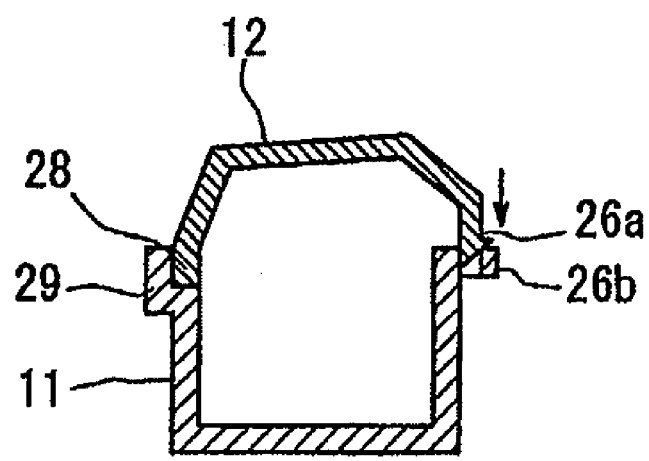
FIG. 5 is a cross-sectional view illustrating an alternative lid shape.
Figure 6:
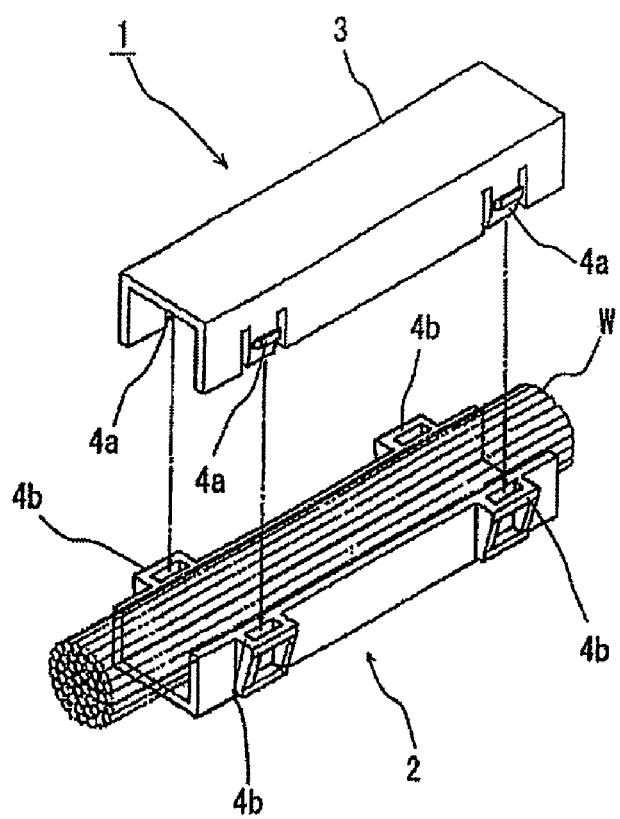
FIG. 6 illustrates a conventional example.
Figure 7:
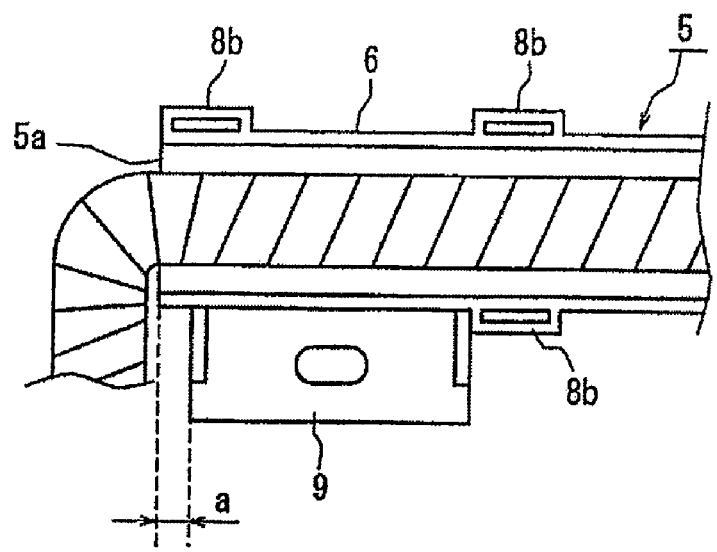
FIGS. 7A and 7B illustrate problems with the conventional example.
Figure 7:
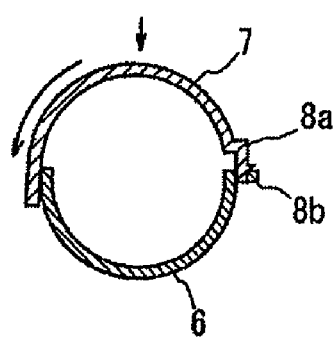

The present invention is not limited to the above-described embodiment. For example, the protector may be applied to cases where the lid 12 has a cross-sectionally inverted V shape, as shown in FIG. 4, and a cross-sectionally trapezoidal shape, as shown in FIG. 5. When locking portions are not provided on both side positions opposing each other, a side having no locking portion slides and thus causes difficulty in locking of a side having a locking portion. Providing the projection 28 on the lid 12 on one side of the opposing positions and the stopper 29 receiving the projection piece 28 on the protector main body 11, however, prevents the lid 12 from sliding and causing a gap and allows easy locking of the locking hook 26a on the other side to the locking hook engaging frame 26b.

What is claimed is:

1. A protector comprising:
   a protector main body having an upper surface opening through which an electric wire bundle is inserted; and
   a lid covering the upper surface opening of the protector main body; wherein,
   the protector main body and the lid are resin molded parts; and
   locking hooks engaged with and locked into locking hook engaging frames, the locking hooks being provided in a lower end portion on both sides in a width direction of the lid, the locking hook engaging frames being provided in an upper end portion on both sides in the width direction of the protector main body;
   a portion of the lid having one of cross-sectionally arcuate, inverted V, and trapezoidal shapes; and the lid having one of the shapes is provided with one of the locking hooks on a first side of the lower end portion in the width direction, and a projection having a width on an opposing second side of the lower end portion; and
   the protector main body covered by the lid having one of the shapes is provided with one of the projecting locking hook engaging frames locked with the locking hook on the first side in the width direction, and an L-shaped stopper having a width and contacted by a lower end of the projection on the opposing second side,
   the lid and the protector main body respectively have cross-sectionally arcuate end portions on both sides in a length direction, and are combined to form a cross-sectionally annular shape into which corrugated tubes mounted on the wire harness are fitted; and
   the lid is provided with one of the locking hooks on the first side in the cross sectionally arcuate end portion, and the projection on the second side in the end portion; the facing protector main body is provided with one of the locking hook engaging frames on the first side in the cross-sectionally arcuate end portion, and a projecting vehicle fixing portion and the stopper on the second side in the end portion, the vehicle fixing portion being provided proximate to an end of the second side, the stopper being provided between the vehicle fixing portion and the end.

* * * * *